US006411741B1

(12) United States Patent
Hamamura et al.

(10) Patent No.: US 6,411,741 B1
(45) Date of Patent: Jun. 25, 2002

(54) IMAGE PROCESSING APPARATUS

(75) Inventors: Naoko Hamamura; Haruko Kawakami, both of Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/231,900

(22) Filed: Jan. 14, 1999

(30) Foreign Application Priority Data

Jan. 14, 1998 (JP) ............................................ 10-005749
Nov. 20, 1998 (JP) ............................................ 10-330794

(51) Int. Cl.$^7$ ................................................. G06K 9/38
(52) U.S. Cl. ...................................... 382/254; 382/261
(58) Field of Search ................................ 382/254–255, 382/260–269

(56) References Cited

U.S. PATENT DOCUMENTS

| 5,018,024 | A |   | 5/1991 | Tanioka ...................... 358/457 |
| 5,889,885 | A | * | 3/1999 | Moed et al. ................. 382/172 |
| 6,215,904 | B1 | * | 4/2000 | Lavallee ...................... 382/234 |

FOREIGN PATENT DOCUMENTS

| EP | 0961218 | * | 1/1999 |
| JP | 6-343129 | * | 12/1994 |

OTHER PUBLICATIONS

IBM Technical Discloseure Bulletin vol. 31, No. 7, pp. 73–74, "Automatic Document Segmentation" (Document NN881201).*

* cited by examiner

*Primary Examiner*—Thomas D. Lee
*Assistant Examiner*—Stephen Brinich
(74) *Attorney, Agent, or Firm*—Foley & Lardner

(57) ABSTRACT

An image processing apparatus aiming at enhancing image quality of a character (line image component) includes an image area discrimination section for discriminating an image area (character area). In the image area discrimination section, a color converter section converts an input CMY signal to Y'-, I'- and Q'-signals for discrimination. An LPF section performs a smoothing process for the Y'-signal and an output signal from a line memory, which is a line delay signal of the Y'-signal. A density gradient extraction section generates a density gradient equivalent amount from a smoothed output from the LPF section and output signals from line memories, which are line delay signals of the output form the LPF section. An arithmetic section performs an arithmetic operation based on the density gradient equivalent amount generated by the arithmetic section, the Y'-signal, and a predetermined value from a main CPU.

6 Claims, 14 Drawing Sheets

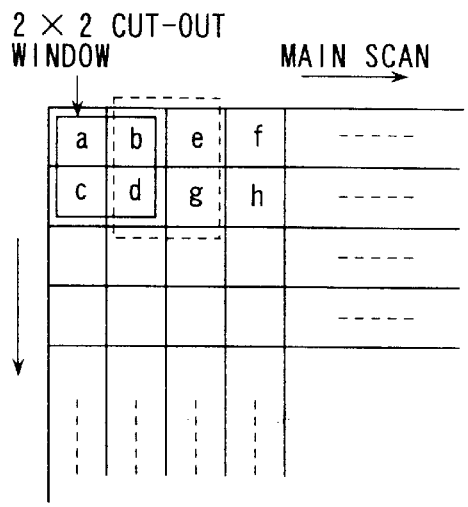
FIG. 3A
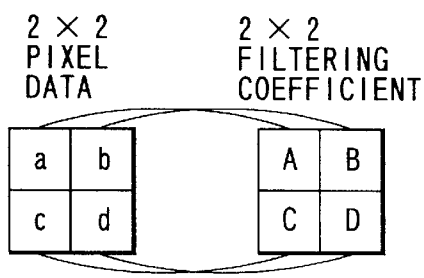
FIG. 3B
FIG. 3C $\quad \dfrac{aA+bB+cC+dD}{4}$
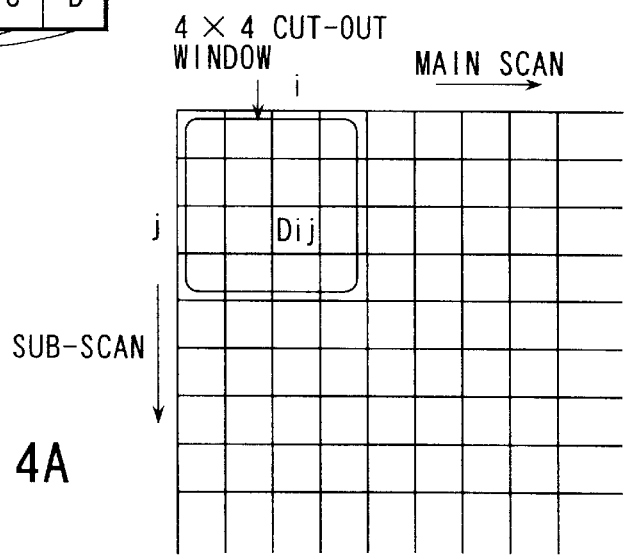
FIG. 4A
FIG. 4B
$\Delta D = MAX(Dij) - MIN(Dij)$
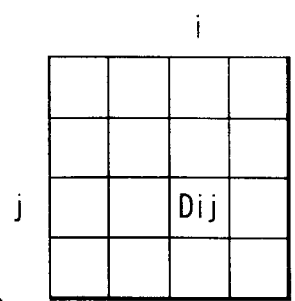
FIG. 4C
$\Delta D = 16 - 1 = 15$

OUTPUT EQUIVALENT TO DENSITY
GRADIENT EXTRACTION PORTION (2107)

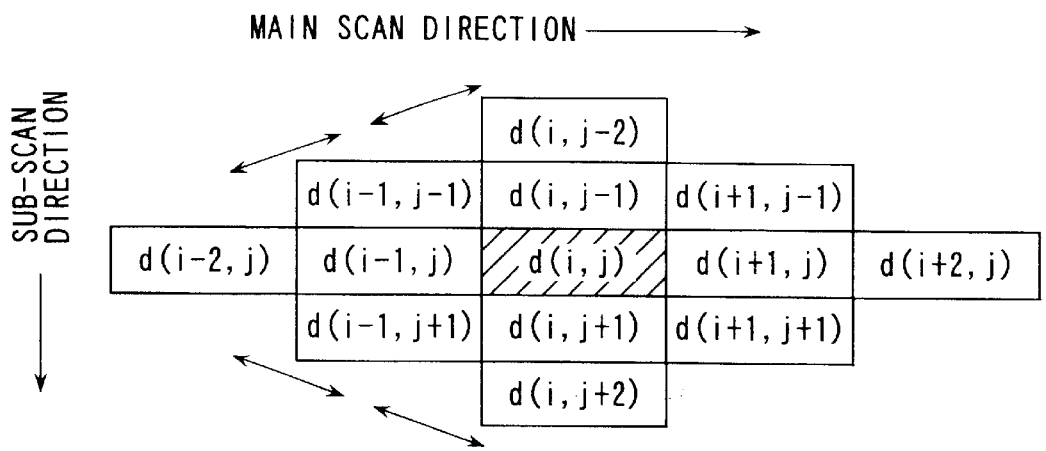
FIG. 12
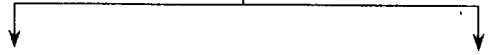
FIG. 13A
FIG. 13B
FIG. 13C

NORMAL CHARACTER IMAGE
ON WHITE BACKGROUND

CHARACTER IMAGE ON COLOR
BACKGROUND

LIGHT CHARACTER IMAGE
ON WHITE BACKGROUND

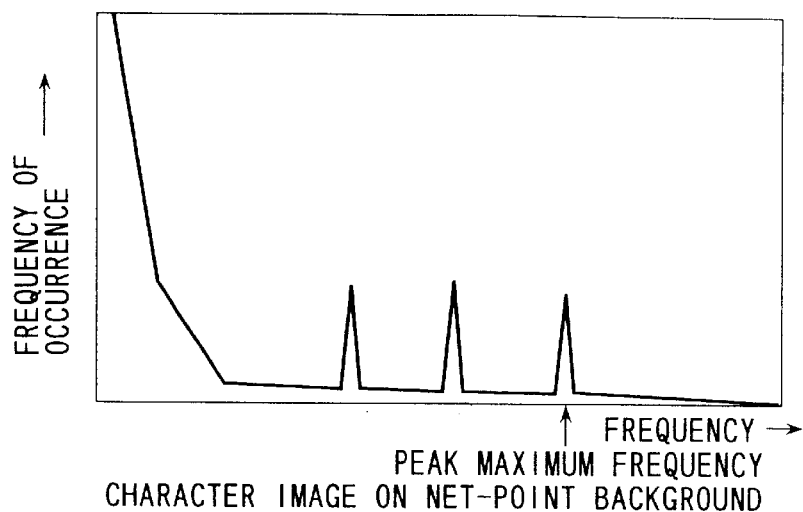
FIG. 19A  CHARACTER IMAGE ON NET-POINT BACKGROUND
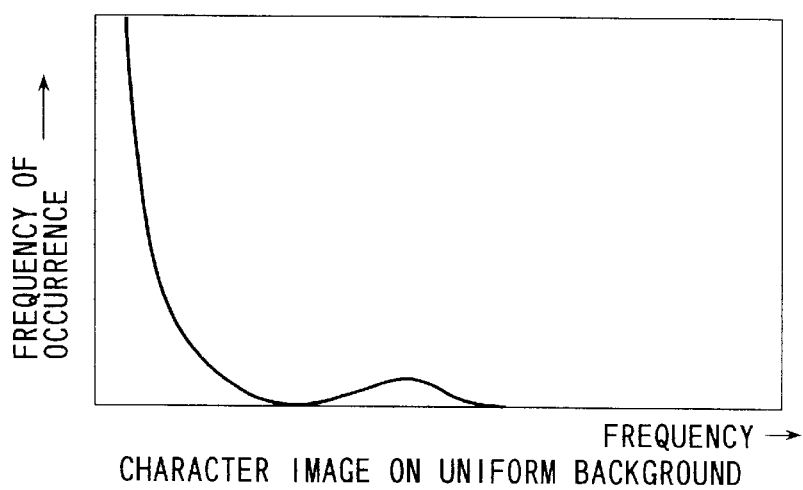
FIG. 19B  CHARACTER IMAGE ON UNIFORM BACKGROUND
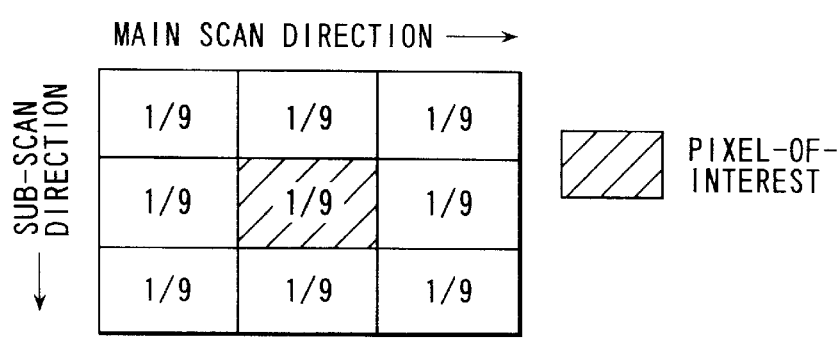
FIG. 20A  FILTER PROCESS OPERATOR FOR NET-POINTS
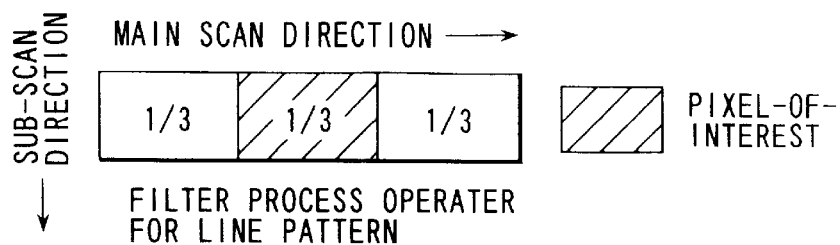
FIG. 20B  FILTER PROCESS OPERATER FOR LINE PATTERN

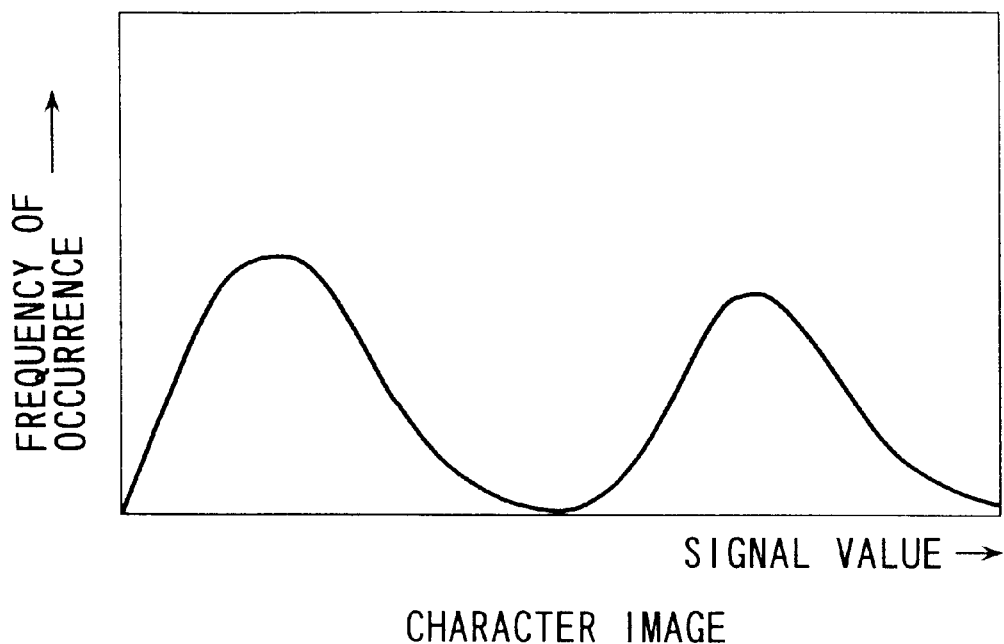
FIG. 22A CHARACTER IMAGE
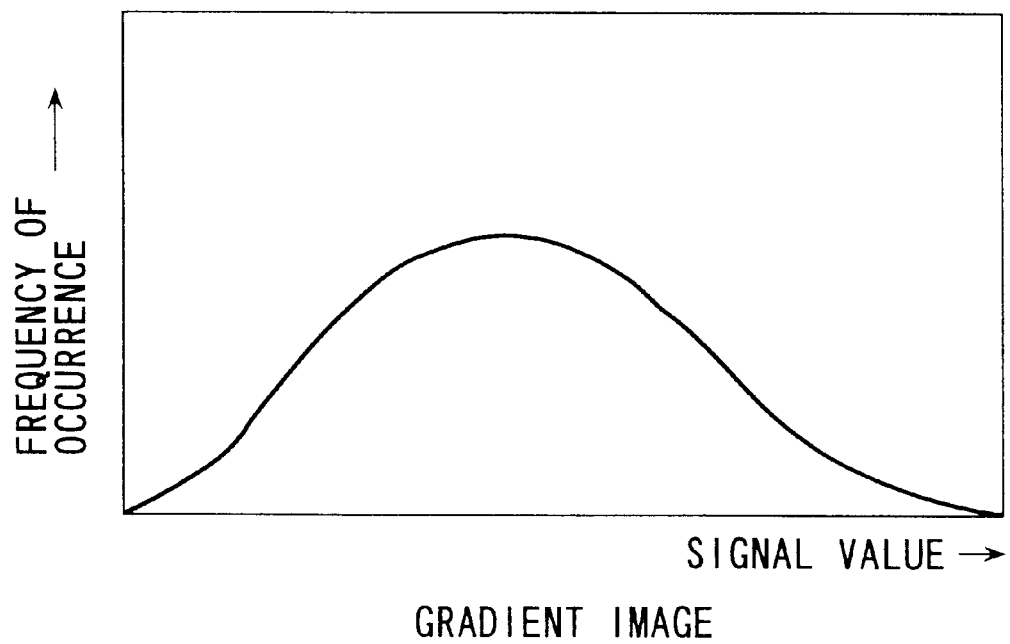
FIG. 22B GRADIENT IMAGE

IMAGE PROCESSING APPARATUS

BACKGROUND OF THE INVENTION

The present invention relates to an image processing apparatus for enhancing the quality of characters (line image components) included in an image formed, for example, by a digital color electronic copying machine for forming a color image.

In general, in the field of image forming apparatus, such as a digital PPC (Plain Paper Copier), for enhancing the quality of characters (line image components) included in an image, there is known a method of emphasizing characters (line image components) by detecting a density gradient (BAT method) of a predetermined area on the image, discriminating a portion with a high gradient to be a character (line image component), and increasing the density of the discriminated portion, thereby emphasizing a contrast between the character (line image component) and the background portion and thus enhancing the image quality. There is also known a method wherein the above-mentioned discriminated portion is expanded in a main scan direction and a sub-scan direction and thus the contrast is emphasized.

However, with the above-mentioned discrimination technique of BAT method, the density of only a contour portion of the character (line image component) is increased and an inside portion of the character (line image component) is viewed to have a low density.

Recently, in most copying machines, a discrimination process is performed in an initial setting mode on an original on which a character image and a gradient image are mixed, and predetermined image processing is performed on the character image and gradient image. It is desired that of those images, the character image be subjected to a process for obtaining a clearer image even if the number of gradients decreases, and the gradient image be subjected to a process for obtaining a smoother image with a large number of gradients.

An area discrimination technique is thus indispensable for determining which individual pixels of an image input to the copying machine belong to which image portions.

Jpn. Pat. Appln. KOKOKU Publication No. 4-5305, etc. describes a prior-art area discrimination method in which a two-dimensional block of a predetermined size is prepared, a pixel value of a pixel of interest is compared with a pixel value of a peripheral pixel, and if a difference is greater than a predetermined value, the presence of an edge is determined and detected as a component of a character or a line.

Jpn. Pat. Appln. KOKOKU Publication No. 5-56067, Jpn. Pat. Appln. KOKOKU Publication No. 5-50187, Jpn. Pat. Appln. KOKOKU Publication No. 5-46789, etc. describe that absolute values of a difference between adjacent image components in a two-dimensional block of a predetermined size are found in a main scan direction and a sub-scan direction, and a sum of integrated values is compared with a predetermined threshold value, thereby discriminating attributes of the image components.

In such methods, in general, detection is made on the basis of the found characteristics amount under predetermined conditions. In most of such methods, an edge portion of a character alone is discriminated. However, in a case where a character with thick lines, such as a logo, is discriminated by a method of using an edge portion, if an emphasis process is performed, only an edge portion discriminated as a character is emphasized and a so-called "hollow state" occurs within the character.

Besides, there is an original on which an edge itself cannot easily be detected, like a pencil-written manuscript on which a character itself is thin. In such a case, most of characters are not discriminated and consequently characters obtained as outputs become difficult to read.

As has been described above, if the discrimination process using the character discrimination method based merely on the characteristic amount for detecting the so-called edge portion of the image is performed, as in the prior art, only the edge portion of the character as in the case of a logo including a thick line and the inner area of the character is not detected. As a result, the so-called "hollow state" occurs.

Moreover, there is an original, such as a pencil-written manuscript, on which a character itself is thin and the edge portion thereof is difficult to detect. Since most of characters are not discriminated in this case, most characters are output in a blurring state. As a result, output characters become difficult to read.

If the above problems are to be solved by the process of expanding discrimination signals, the scale of hardware increases undesirably due to an increase in the number of line memories.

BRIEF SUMMARY OF THE INVENTION

The object of the present invention is to provide an image processing apparatus wherein not only an edge portion but also an inside portion of a character (line image component) is discriminated and the quality of the character (line image component) is enhanced.

According to the present invention, in order to achieve the object, there is provided an image processing apparatus comprising: characteristic amount calculation means for calculating a characteristic amount on the basis of an input image signal; and discrimination generation means for generating a discrimination signal for discriminating attributes of the input image signal, on the basis of the characteristic amount calculated by the characteristic amount calculation means and the input image signal, wherein an image process is switched in accordance with the discrimination signal generated by the discrimination generation means.

According to the present invention, in order to achieve the object, there is provided an image processing apparatus comprising: control means for outputting a control signal for switching calculation conditions for characteristic amounts and discrimination conditions for attributes in accordance with a set document mode; characteristic amount calculation means for calculating a characteristic amount of an input image signal on the basis of the calculation condition switched by the control signal output from the control means; first multiplication means for multiplying the characteristic amount calculated by the characteristic amount calculation means with a predetermined coefficient; second multiplication means for multiplying the input image signal with a predetermined coefficient; attribute discrimination means for generating a discrimination signal for discriminating attributes of the input image signal on the basis of an output from the first multiplication means and an output from the second multiplication means, under the attribute discrimination condition switched by the control signal from the control means; and output means for outputting an image signal which has been subjected to an image process according to the discrimination signal from the attribute discrimination means.

According to the present invention, in order to achieve the object, there is provided an image processing apparatus comprising: control means for effecting switching between an image signal for image processing and an image signal for pre-processing; processing means for finding a cumulative frequency of a signal value of the image signal for pre-processing, which is switched and input by the control means; characteristic amount calculation means for calculating a characteristic amount of the image signal for image processing, which is switched and input by the control means, on the basis of the cumulative frequency found by the processing means; first multiplication means for multiplying the characteristic amount calculated by the characteristic amount calculation means with a predetermined coefficient; second multiplication means for multiplying the image signal for image processing, which is switched and input by the control means, with a predetermined coefficient; attribute discrimination means for discriminating attributes of the input image signal for image processing, on the basis of an output from the first multiplication means and an output from the second multiplication means, with reference to the cumulative frequency found by the processing means; and output means for outputting an image signal which has been subjected to an image process according to attribute discrimination information from the attribute discrimination means.

According to the present invention, in order to achieve the object, there is provided an image processing apparatus comprising: control means for effecting switching between an image signal for image processing and an image signal for pre-processing; processing means for finding a frequency distribution of the image signal for pre-processing, which is switched and input by the control means; characteristic amount calculation means for calculating a characteristic amount of the image signal for image processing, which is switched and input by the control means, on the basis of the frequency distribution found by the processing means; first multiplication means for multiplying the characteristic amount calculated by the characteristic amount calculation means with a predetermined coefficient; second multiplication means for multiplying the image signal for image processing, which is switched and input by the control means, with a predetermined coefficient; attribute discrimination means for discriminating attributes of the input image signal for image processing, on the basis of an output from the first multiplication means and an output from the second multiplication means, with reference to the frequency distribution found by the processing means; and output means for outputting an image signal which has been subjected to an image process according to attribute discrimination information from the attribute discrimination means.

According to the present invention, in order to achieve the object, there is provided an image processing apparatus comprising: area discrimination means for discriminating whether a predetermined area of an input image signal includes a character image; characteristic amount calculation means for calculating a characteristic amount of the input image signal on the basis of a discrimination result from the area discrimination means; first multiplication means for multiplying the characteristic amount calculated by the characteristic amount calculation means with a predetermined coefficient; second multiplication means for multiplying the input image signal with a predetermined coefficient; attribute discrimination means for discriminating attributes of the input image signal on the basis of an output from the first multiplication means and an output from the second multiplication means, with reference to the discrimination result from the area discrimination means; and output means for outputting an image signal which has been subjected to an image process according to attribute discrimination information from the attribute discrimination means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 3A to 3C are views for explaining a smoothed image in 2×2 pixels;

FIGS. 4A to 4C are views for explaining a density gradient extraction process in the case of 4×4 pixels;

FIG. 12 shows an operator for detecting a slanting line;

FIGS. 13A to 13C show examples of values of pixels on which characteristic amounts were found;

FIGS. 19A and 19B are views for explaining frequency distributions in character images on a net-like background and a uniform background;

FIGS. 20A and 20B show examples of an operator for performing a filtering process;

FIGS. 22A and 22B show examples of histograms.

DETAILED DESCRIPTION OF THE INVENTION

A first embodiment of the present invention will now be described.

Figure 1:
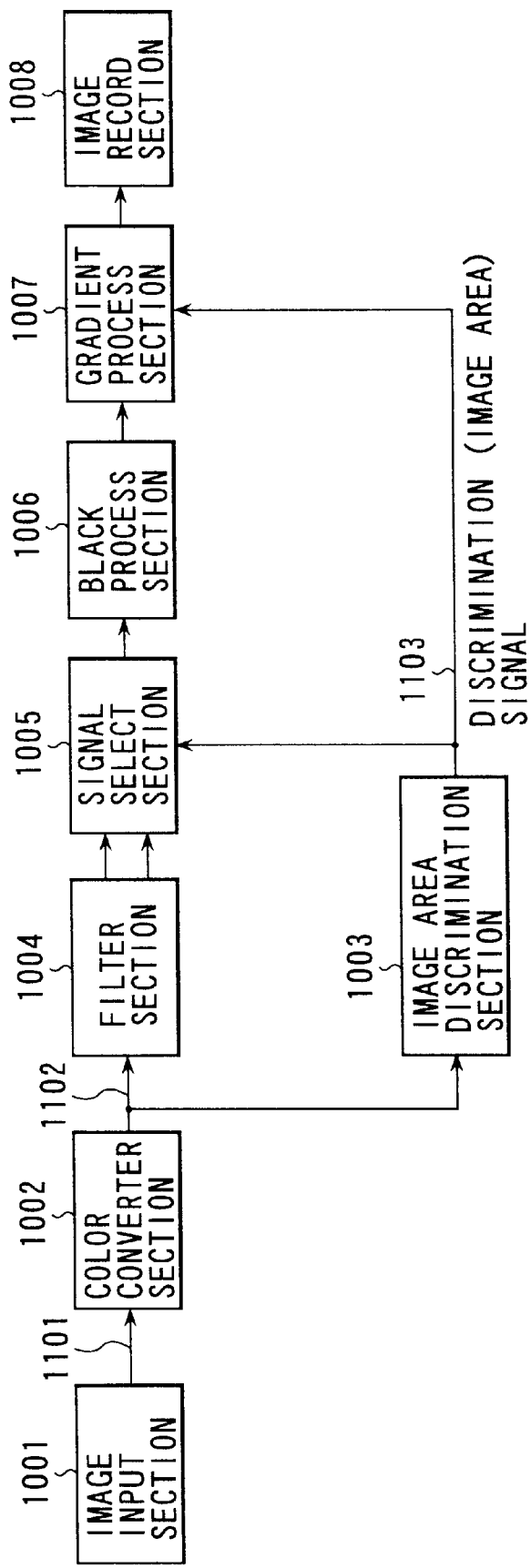
FIG. 1 is a block diagram showing the structure of an image processing apparatus.

FIG. 1 schematically shows the structure of an image processing apparatus 36. The image processing apparatus 36 is a most important portion of the present invention, as will be described below. The image processing apparatus 36 extracts characteristic amounts on the contrast of the document on the basis of input image data items R, G and B, discriminates a character (line image component) on the document and a background area on the basis of the extracted information amounts, and subjects to an emphasis process the character (line image component) of an image to be output, on the basis of the discrimination information amount.

The image processing apparatus 36 comprises an image input section 1001, a color converter section 1002, an image area discrimination section 1003, a filter section 1004, a signal select section 1005, a black process section 1006, a gradient process section 1007 and an image record section 1008.

The image input section 1001 is an input process section for inputting image data from the color scanner section 1.

The color converter section 1002 converts R-, G- and B-image data 1101 from the image input section 1001 to three primary-color data items C (cyan), M (magenta) and Y (yellow) for controlling color materials for forming images in the color printer section 2. The conversion is performed by various methods, for example, by a masking method.

The basic formula for this is as follows:

$$\begin{bmatrix} C \\ M \\ Y \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} R \\ G \\ B \end{bmatrix}$$

The image area discrimination section 1003 produces a discrimination signal for discriminating the character (line image component) on the basis of CMY signals 1102 output from the color converter section 1002.

The filter section 1004 produces signals obtained by smoothing the CMY signals 1102 output from the color converter section 1002 as well as signals obtained by edge-emphasizing the CMY signals 1102.

In order to emphasize the character (line image component), the signal select section 1005 selects either the smoothed signals or edge-emphasized signals from the filter section 1004 on the basis of the discrimination signal produced by the image area discrimination section 1003, and delivers the selected signals to the black process section 1006.

The black process section 1006 performs a black process, aiming at reducing the consumption of color materials or enhancing color reproducibility in the formation of color images.

On the basis of the discrimination (image area) signal produced by the image area discrimination section 1003, the gradient process section 1007 subjects the image data black-processed by the black process section 1006 to a publicly known pseudo-halftone process, e.g. a process for enhancing the gradient reproducibility of the output image by means of, e.g. a dither method or an error diffusion method.

The image record section 1008 is connected to the laser driver 113 of the color printer section 2 and performs a PWM (Pulse Width Modulation) for converting the image data subjected to the pseudo-halftone process in the gradient process section 1007 to a laser on/off signal for driving the semiconductor laser 60.

Figure 2:
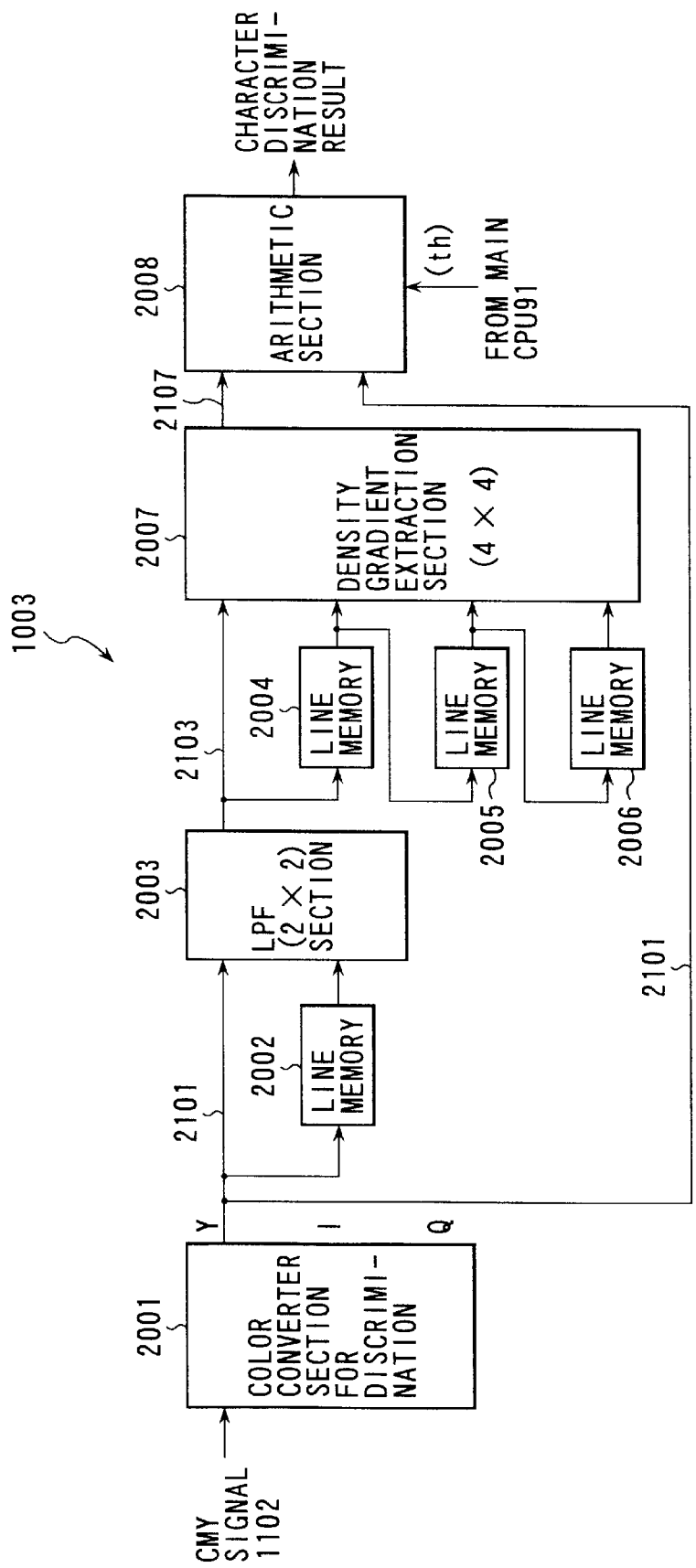
FIG. 2 schematically shows the structure of an image area discrimination section.

FIG. 2 schematically shows the structure of the image area discrimination section 1003. Specifically, the image area discrimination section 1003 comprises a color converter section 2001 for discrimination, which serves as converter means, a line memory 2002, a low-pass filter (LPF) 2003, line memories 2004, 2005 and 2006, a density gradient extraction section 2007 serving as extraction means for extracting a density gradient equivalent, and an arithmetic section 2008 serving as discrimination signal generation means.

The color converter section 2001 for discrimination converts the CMY signal 1102 input from the color converter section 1002 to a signal Y' (density) and signals I' and Q' (chrominance). The color converter section 2001 delivers signal Y' 2101 to the line memory 2002 and LPF section 2003. The formula for color conversion is expressed by:

$$Y'=(C+M+Y)/3$$

$$I'=M-C$$

$$Q'=M-Y$$

In the present embodiment, it is supposed that the discrimination signal is produced by paying attention only to the Y' (density) signal of the three signals, the Y' (density) signal and I' and Q' (chrominance) signals.

The line memory 2002 stores the Y' (density) signal 2101 corresponding to one-line image data, and sends to the LPF section 2003 information of the line immediately preceding the currently processed line.

The LPF section 2003 performs a (2×2)-pixel smoothing process for the output from the line memory section 2002. In general, in an (m×m) filtering process, an image is cut out by using a window with a size of m×m pixels around a pixel-of-interest. The respective pixel data items are individually multiplied with associated predetermined (m×m) coefficients in a matrix. The multiplication results are summed by a product-summing operation.

The window for cutting out the image is displayed on a pixel-by-pixel basis in the main scan direction and sub-scan direction and the product-summing operation is performed for all pixels. Thus, a smoothed image is obtained.

For example, in FIGS. 3A and 3B, if the values of 2×2 pixels cut out from image data are expressed by and the values of coefficients of the filter are expressed by $$\begin{bmatrix} a & b \\ c & d \end{bmatrix}$$

and the values of coefficients of the filter are expressed by $$\begin{bmatrix} A & B \\ C & D \end{bmatrix}$$

then a value a' obtained after filtering the pixel-of-interest is expressed by $$a'=(aA+bB+cC+dD)/4.$$

In the present embodiment, the filtering coefficients are expressed by $$\begin{bmatrix} A & B \\ C & D \end{bmatrix} = \begin{bmatrix} 1 & 1 \\ 1 & 1 \end{bmatrix}$$

From formula (4), a' is given by $$a' = (a+b+c+d)/4$$

The above-described smoothing process is performed by the combination of the line memory section 2002 and LPF section 2003.

An output 2103 of the LPF section 2003, which is the smoothed data, is sent to the line memory 2004 and density gradient extraction section 2007.

As is shown in FIG. 2, the line memories 2004, 2005 and 2006 are tandem-connected. The smoothed data 2103 is sent to the initial-stage line memory 2004.

Each of the line memories 2004, 2005 and 2006 is designed to store one-line image data. These line memories send line data items immediately previous, second previous, and third previous to the currently processed line data to the density gradient extraction section 2007, and also the line memories 2004 and 2005 send such line data items to the next line memories.

The density gradient extraction section 2007 receives the output 2103 of the LPF section 2003 and its delayed signals from the line memories 2004, 2005 and 2006, and produces a density gradient equivalent amount and sends it to the arithmetic section 2008.

In the meantime, the BAT method is a method widely used for finding a density gradient equivalent amount.

At first, an image is cut out by using a window with a size of m×m pixels around a pixel-of-interest. A value corresponding to a difference between a maximum value and a minimum value of the pixels is obtained. Like the LPF section 2003, the arithmetic section 2008 performs such operations on all pixels of the image, while moving the cutting-out window on a pixel-by-pixel basis in the main scan direction and sub-scan direction, and outputs the obtained values.

If the density value data of each pixel is Dij (i=1, 2, 3, 4, j=1, 2, 3, 4), a produced value ΔD of the density gradient equivalent amount of the pixel-of-interest is expressed by $$\Delta D = \max(Dij) - \min(Dij)$$

where max is a function for finding a maximum value, and min is a function for finding a minimum value.

In the BAT method, the density gradient equivalent amount ΔD is compared with a predetermined threshold. In this embodiment, it is supposed that this density gradient equivalent amount ΔD is used.

FIGS. 4A and 4B illustrate a density gradient extraction process in the case of 4×4 pixels. The above-described process is carried out by the combination of the line memories 2004, 2005 and 2006 and density gradient extraction section 2007.

The arithmetic section 2008 performs arithmetic operations on the basis of two dada items, i.e. the output 2101 from the color converter section 2001 for discrimination, and the output 2107 from the density gradient extraction section 2007, and outputs a discrimination result indicating whether the image belong to the character portion (line image component) or the background portion.

Specifically, the arithmetic section 2008 outputs an arithmetic operation result obtained on the basis of the output signal 2107 indicating the density gradient equivalent amount, the signal 2101 from the color converter section 2001 for discrimination, which indicates the density itself, and a predetermined value th. This output is sent, as a character discrimination result, to the signal select section 1005 and gradient process section 1007.

Figure 5:
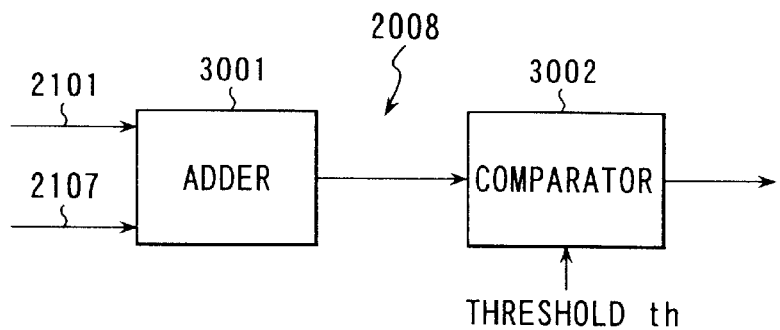
FIG. 5 shows an example of the structure of an arithmetic section.

FIG. 5 shows an example of the structure of the arithmetic section 2008. The arithmetic section 2008 comprises an adder 3001 serving as adding means and a comparator 3002 serving as comparing means.

The adder 3001 adds the output signal 2107 (hereinafter referred to as "density gradient equivalent amount") indicating the density gradient equivalent amount, the signal 2101 (hereinafter "density") from the color converter section 2001 for discrimination, which indicates the density itself.

The comparator 3002 compares the predetermined threshold th and the addition signal from the adder 3001.

The comparator 3002 selectively outputs the following values:

0(th≧(density 2101)+(density gradient equivalent amount))→non-character area

1(th<(density 2101)+(density gradient equivalent amount))→character area.

This output signal is a character discrimination signal.

Figure 6:
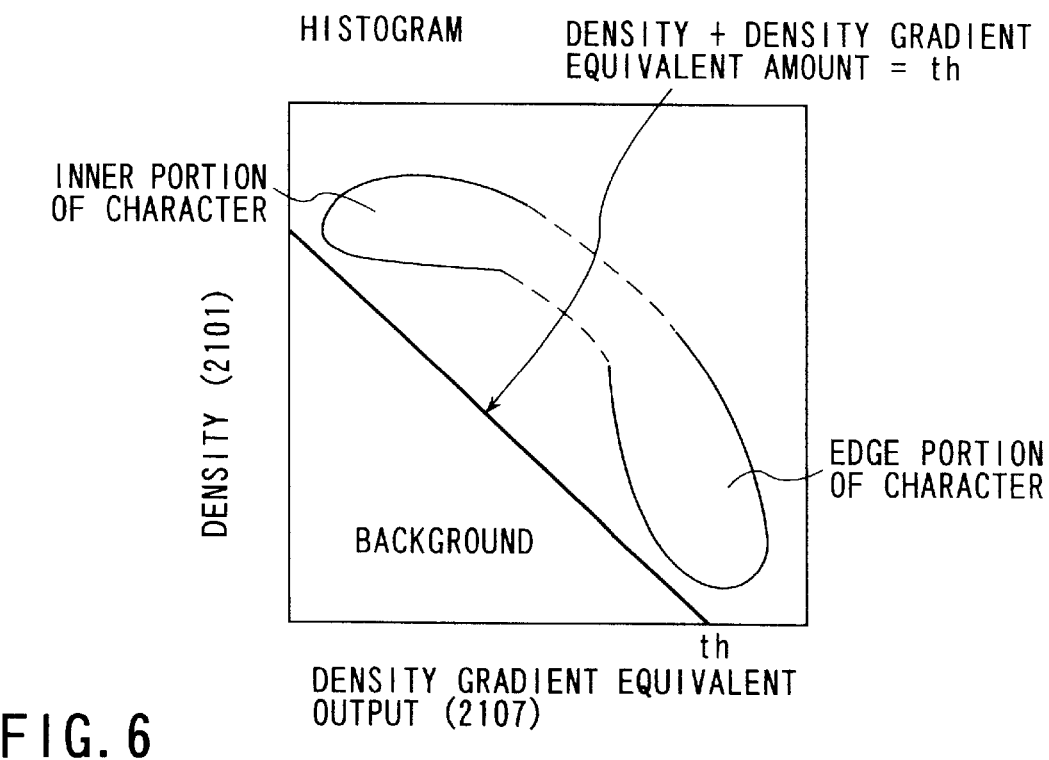
FIG. 6 shows a two-dimensional histogram of a density and a density gradient equivalent amount.

The validity of this selection is illustrated in FIG. 6.

FIG. 6 schematically shows a distribution of the character (line image component) area and background (non-character) area by means of a two-dimensional histogram of the density (2101) and density gradient equivalent amount (2107). FIG. 6 also shows the presence of a straight line proper to divide the character (line image component) area and background (non-character) area.

The formula of this straight line is: (density 2101)+(density gradient equivalent amount 2107)=th. In this formula, the pixels included in the upper area and lower area of the straight line are assigned to "1" and "0".

Of course, there are other methods for dividing the character (line image component) area and background (non-character) area on the two-dimensional histogram.

Figure 7:
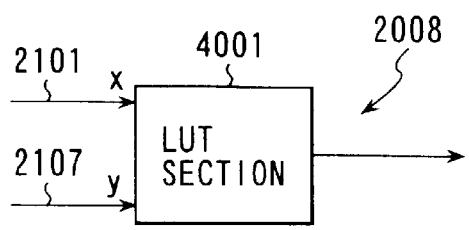
FIG. 7 shows another example of the structure of the arithmetic section.

FIG. 7 shows another example of the structure of the arithmetic section 2008. The arithmetic section 2008 comprises a look-up table (LUT) section 4001.

The LUT section 4001 serving as output means delivers, instead of adding and comparing the density gradient equivalent amount 2107 and density 2101, a given calculation result by searching a two-dimensional matrix table while using the density 2101 and density gradient equivalent amount 2107 as keys.

Figure 8:
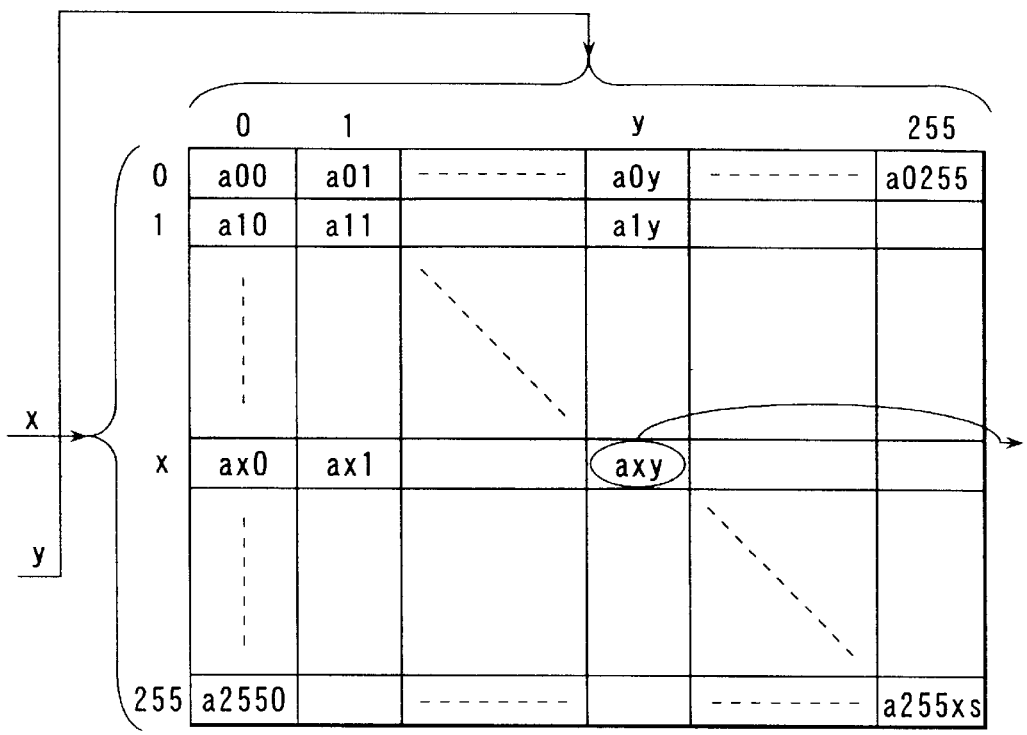
FIG. 8 shows an example of the structure of a two-dimensional matrix table.
Figure 9:
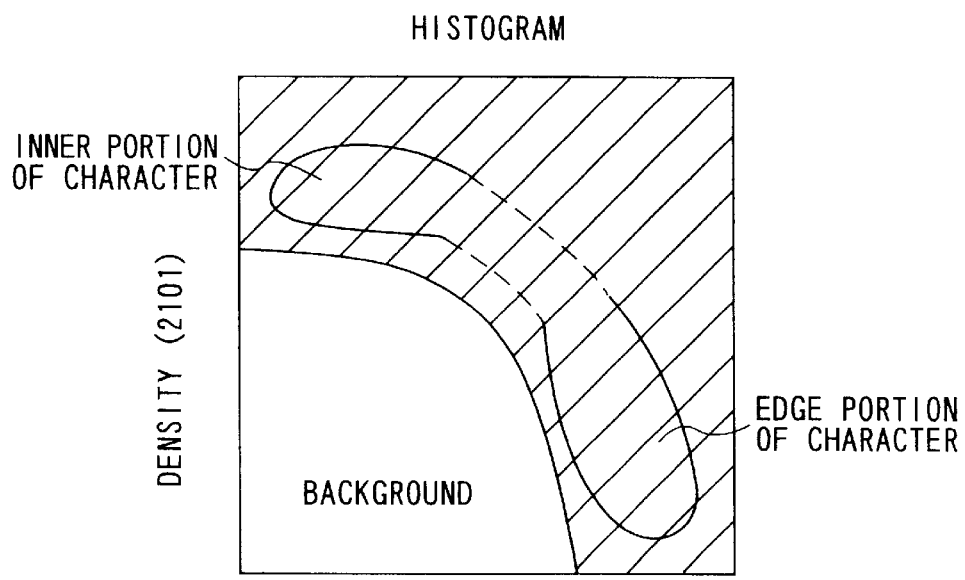
FIG. 9 shows a two-dimensional histogram of a density and a density gradient equivalent amount.

FIG. 8 illustrates this process. In the present embodiment, $a_{xy}$ has a value of either "0" or "1". For example, value "0" is preset to the background portion corresponding to a non-hatched portion in FIG. 9, and value "1" is preset to the character (line image component) portion corresponding to a hatched portion in FIG. 9. Of course, the output of the LUT section 4001 is used as a character discrimination result.

In order to emphasize the character (line image component), the signal select section 1005 shown in FIG. 1 selects either the smoothed signal or the edge-emphasized signal from the filter section 1004 on the basis of the discrimination (image area) signal produced by the image area discrimination section 1003, and delivers the selected signal to the black process section 1006. If the discrimination signal indicates the character (line image) area, the edge-emphasized signal is selected. If the discrimination signal indicates the background area, the smoothed signal is selected.

The black process section 1006 performs the black process in order to reduce the consumption of color materials or enhance the color reproducibility when color images are formed.

The principle of the black process will now be described in brief. From image data C (cyan), M (magenta) and Y (yellow), the following is obtained:

$$k=\min(C, M, Y)$$

where min is a function for obtaining a minimum value.

As a result, image data items corresponding to the consumption amounts of cyan, magenta, yellow and black, which are actually consumed in the color printer section are expressed as shown below, by removing a black material amount obtained by the above formula from the respective consumption amounts:

$$c=C-k$$
$$m=M-k$$
$$y=Y-k$$

In other words, using the black (k) component, the amount of overlapping color materials is reduced and the consumption of each color material can be reduced.

On the basis of the discrimination (image area) signal produced by the image area discrimination section 1003, the gradient process section 1007 shown in FIG. 1 subjects the image data black-processed by the black process section 1006 to a publicly known pseudo-halftone process, e.g. a process for enhancing the gradient reproducibility of the output image by means of, e.g. a dither method or an error diffusion method.

The image record section 1008 shown in FIG. 1 is connected to the laser driver 113 of the color printer section 2 and performs a PWM (Pulse Width Modulation) for converting the image data subjected to the pseudo-halftone process in the gradient process section 1007 to a laser on/off signal for driving the semiconductor laser 60.

The image input section 1001, color converter section 1002, image area discrimination section 1003, filter section 1004, signal select section 1005, black process section 1006, gradient process section 1007 and image record section 1008 are controlled by a main CPU 91. The main CPU 91 provides these sections with necessary data in advance, where necessary, by fetching it from a storage such as ROM 32.

As has been described above, according to the first embodiment, not only the contour portion but also the inside portion of the character (line image component) is discriminated and the image quality of the character (line image component) is enhanced.

Besides, there is no need to increase hardware such as a line memory, as in an expansion process. The entire character (line image component) portion including both the inside and contour portions can be discriminated merely by simple operations and the comparator. Therefore, the density of the contour portion alone can be increased, and the image quality of the character (line image component) can be effectively enhanced.

With respect to the image processing apparatus 36 shown in FIG. 1, another example of the structure comprising the image area discrimination section 1003, filter section 1004 and signal select section 1005 will now be described.

At first, a second embodiment of the present invention will now be described.

Figure 10:
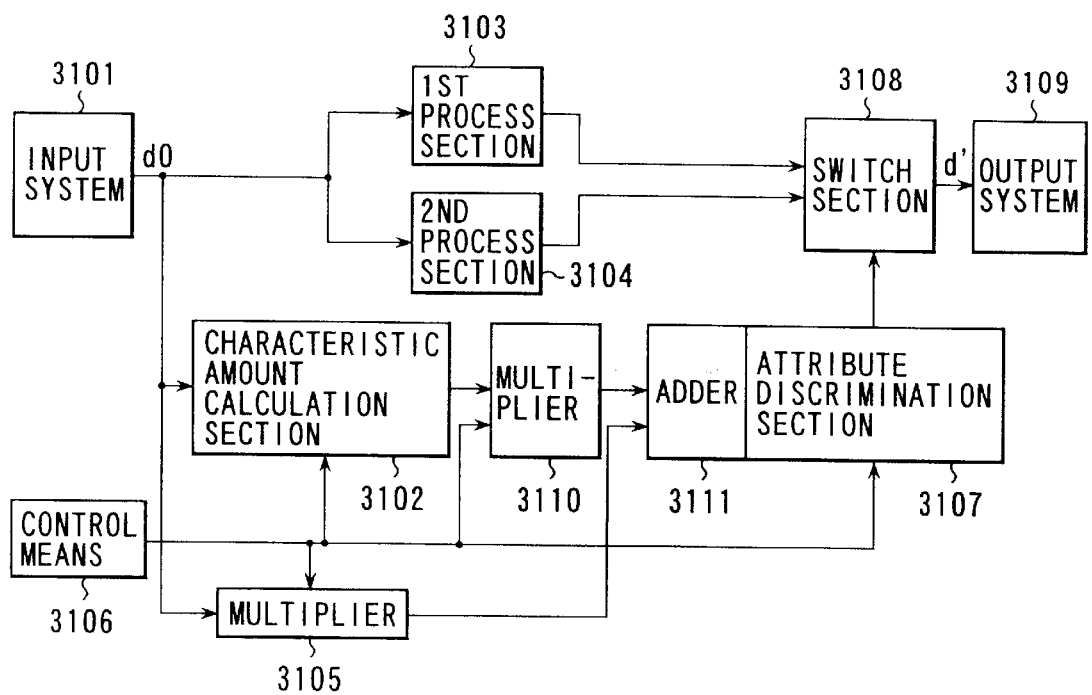
FIG. 10 is a block diagram schematically showing a structure for realizing a second embodiment of the invention.

FIG. 10 schematically shows a structure for achieving the second embodiment.

An image signal d0 is input from an input system 3101. The signal d0 represents an ink amount, e.g. an area ratio, of general process ink such as cyan, magenta, yellow and black (hereinafter referred to as C, M, Y and K). If the value of signal d0 is "0" non-printing is indicated. If the value of signal d0 is "1", 100% printing is indicated. The input system 3101 supplies, as image signals, signal values representing the amount of one or more kinds of ink.

If an input document is monochromic, signal d0 corresponds to only K. If an input document is color-printed, the signal d0 corresponds to four colors, C, M, Y and K, or three colors C, M and Y. The image signal d0 is input to a characteristic amount calculation section 3102, a first process section 3103, a second process section 3104 and a multiplier 3105. An output from the characteristic amount calculation section 3102 is delivered to an attribute discrimination section 3107 via a multiplier 3110. As will be described later in detail, an adder 3111 is provided at the front stage of the attribute discrimination section 3107.

Control means 3106 is provided with a user's parameter set, etc. The control means 3106 selects a document mode so as to obtain a desired image for an input image. The characteristic amount calculation section 3102 calculates, for each kind of ink, a deviation of a differential value in a specific direction of the characteristic amount for finding the likelihood of the presence of a character on the input image. The first and second process sections 3103 and 3104 perform image processes proper to attributes of pixels.

A control signal from the control means 3106, which represents the set document mode, is supplied to the characteristic amount calculation section 3102 and attribute discrimination section 3107. Thus, in accordance with the set document mode, the conditions for calculation of characteristic amount and for determination of attributes are switched. A signal from the attribute discrimination section 3107, which represents the attributes of pixels, is supplied to a switch section 3108. The switch section 3108 switches the outputs from the first and second process sections 3103 and 3104 in accordance with the attributes of pixels. A final image signal d' is delivered from the switch section 3108 to an output system 3109.

The characteristic amount calculation by the characteristic amount calculation section 3102 will now be described in detail.

Figure 11:
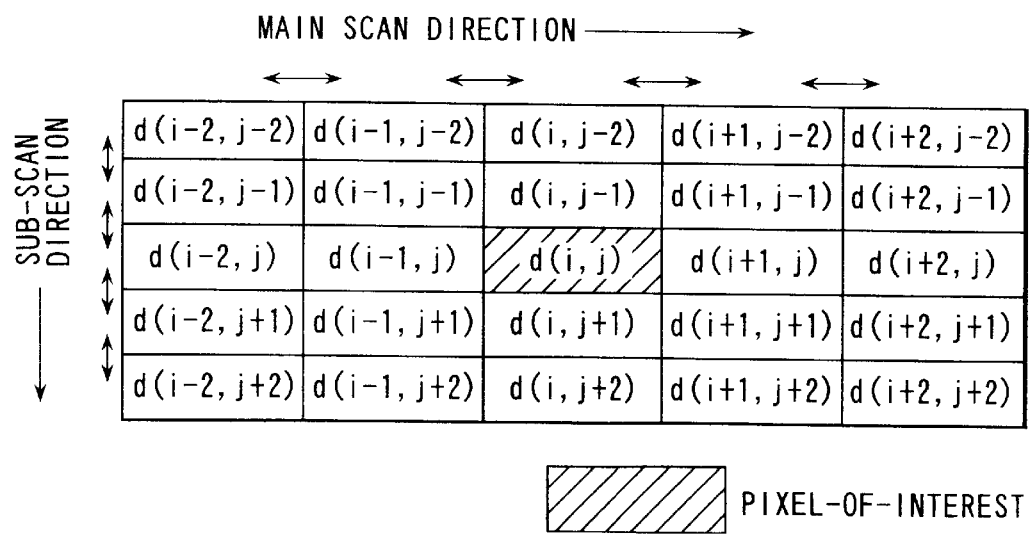
FIG. 11 shows a 5×5-sized operator including a pixel-of-interest and peripheral pixels.

At first the characteristic amount in the main scan direction is found. FIG. 11 shows a (5×5)-sized operator including a pixel-of-interest and its peripheral pixels for finding the characteristic amounts in the main scan direction and sub-scan direction. In FIG. 11, d(i,j) indicates a signal value of the pixel-of-interest. Discrimination may be difficult if the input image is a low-contrast image appearing, for example, on a low-density document on which the density of the image itself is low, such as newspaper on which the density of the background portion is relatively high, or a pencil-written document.

In this case, the signal value d0 in the operator is corrected in a pre-process by using a maximum value d max and a minimum value d min in the operator:

$$d=(d0 \times d\ \min)/(d\ \max - d\ \min) \qquad (1)$$

Subsequently, as shown in FIG. 11 by horizontal arrows, absolute values of differences between adjacent pixels at four locations ((n−1) locations where the size of the operator is n×n) in each row in the main scan direction are found. The maximum alone of the absolute values of differences between pixels at four locations in the main scan direction is extracted. This operation is repeated for all rows, and the maximum values of the absolute values of differences between pixels in the respective rows are summed or averaged to obtain a characteristic amount α main in the main scan direction. This amount is expressed by:

$$\alpha main = \sum_{i=-2}^{2} \max(d(i-1, j+1) - d(i-2, j+1), \ldots, d(i+2, j+1) - d(i+1, j+1)) \quad (2)$$

where i is the address of the pixel-of-interest in the main scan direction, j is the address of the pixel-of-interest in the sub-scan direction, and d(i,j) is the signal value of the pixel-of-interest.

On the other hand, the characteristic amount in the sub-scan direction is found similarly. In the sub-scan direction, too, as shown in FIG. 11 by vertical arrows, absolute values of differences between pixels in each column in a direction different from the main scan direction, in which the absolute values of differences between pixels are found, are found. The maximum value alone of the absolute values of differences in each column is chosen, and the maximum values of the absolute values of differences between pixels in the respective columns are summed or averaged, thus obtaining a sub-scan directional characteristic amount αsub. This is expressed by $$\alpha sub = \sum_{k=-2}^{2} \max(d(i+k, j-1) - d(i+k, j-2), \ldots, d(i+k, j+2) - d(i+k, j+1)) \quad (3)$$

From the obtained characteristic amounts in the main scan direction and sub-scan direction, the value α0 representing the likelihood of the pixel-of-interest being a character or a line is obtained, for example, by the following equation:

$$\alpha 0 = abs(\alpha main - \alpha sub) \quad (4)$$

The value representing the likelihood of the character or line can be expressed not only by the absolute value of difference, as in equation (4), but also by the ratio of absolute values. If αmain≧αsub, αmain/αsub is set to be the value α0 representing the likelihood of the character or line. If αmain<αsub, αsub/αmain is set to be the value α0 representing the likelihood of the character or line. The greater the value α0 representing the likelihood of the character or line, the higher the likelihood of the pixel-of-interest being a portion of the character or line.

It is possible to detect, from the found value α0 representing the likelihood of the character or line, a portion of a line slightly inclined with respect to a line extending in the main scan direction or sub-scan direction. However, it is difficult to detect a portion of a line inclined at 45° or thereabouts in a direction between the main scan direction and the sub-scan direction.

With use of an operator as shown in FIG. 12 as auxiliary means, the inclined line, which is difficult to detect with the above-described operation, is detected. If an angle of inclination is θ and amounts of displacement in two directions are k and l, address components k' and l' of pixel d (i+k', j–l') referring to the pixel value can be expressed by $$k' = k \cdot \cos \theta + l \cdot \cos(\theta - \pi/2) \quad (5A)$$

$$l' = k \cdot \sin \theta + l \cdot \sin(\pi/2 - \theta) \quad (5B)$$

Compared to the operator having a reference region in the main scan direction and sub-scan direction, the operator shown in FIG. 12 having a reference region in an inclined direction covers more rows and columns if the same number of pixels are to be taken. Accordingly, a greater buffer amount is required. Thus, use is made of the operator having a less number of pixels to be referred to than the operator for the main scan direction and sub-scan direction.

Strictly speaking, the precision of discrimination of an inclined line decreases due to the adoption of the above technique. However, constituent pixels of, in particular, most Chinese characters and lines can be extracted from the characteristic amounts in the main scan direction and sub-scan direction and the resolution of the human eye in slanting directions is low. Therefore, there arises no special problem.

The same method as that for calculating the characteristic amounts in the main scan direction and sub-scan direction is adopted. Absolute values of differences between pixels are taken in the directions of arrows shown in FIG. 12. Maximum values (two in this case) in both directions are chosen and then summed or averaged to obtain values αmain+45 and αsub+45. Then an absolute value α45 of a difference between both values or a ratio of αmax/αmin is obtained.

In this manner, calculations are performed for characteristic amounts of constituent pixels of characters or lines in all directions. FIGS. 13A to 13C show examples of values of pixels, the characteristic amounts of which were obtained by this technique. Those pixels in the block representing characteristic amounts, which are marked by hatching, are recognized as a portion of a character or a line. In FIG. 13B, components in the main scan direction and sub-scan direction are detected. In FIG. 13C, components in the slanting direction are detected.

Recently, in a case where a document is one output from a copying machine, gradient expression is often made by a line pattern, rather than by a net-point pattern as in ordinary printed matters. If such a document is input, even a pattern for gradient expression is discriminated as a portion of a character or a line, resulting in a degradation in image quality. In order to prevent this problem, image signals are generally smoothed and filtered before characteristic amounts are obtained. In the present invention, erroneous discrimination is prevented by a method described below.

Specifically, in the present embodiment, the control means 3106 can set, as document modes, a character mode or a high-definition mode and a normal mode. Alternatively, the control means 3106 can set a normal mode and a copy-output-processible mode. In the case of the former combination of modes, only when the normal mode is selected, the interval of pixels for finding absolute values of differences between pixels is increased.

Figure 14:
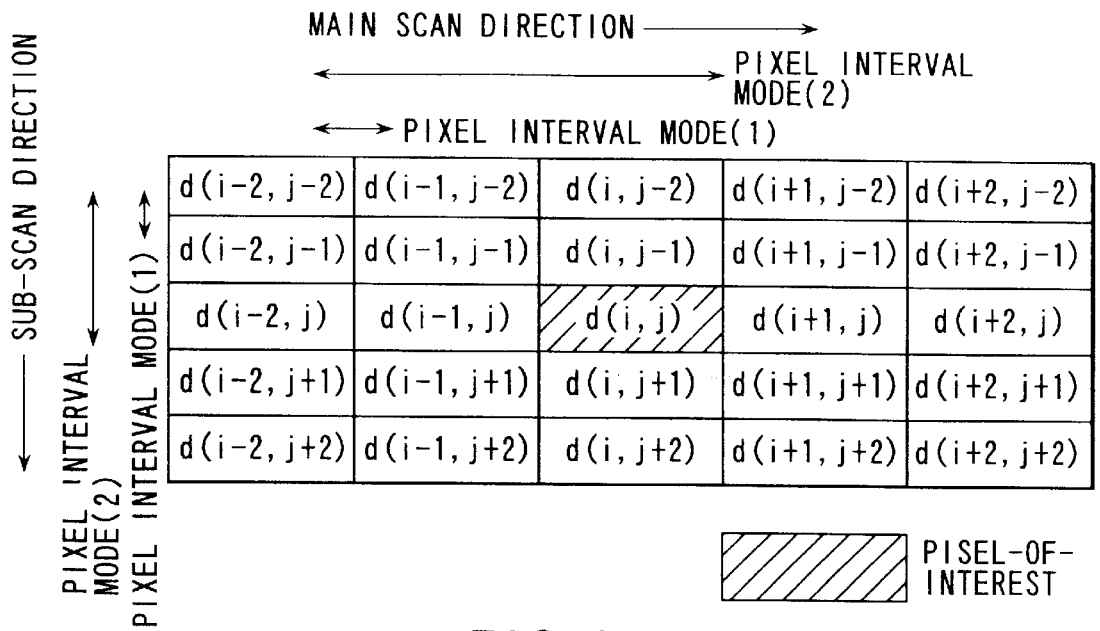
FIG. 14 shows an example of an inter-pixel interval for obtaining an absolute value of a difference between modes.

FIG. 14 shows an example of the pixel interval for obtaining absolute values of differences in accordance with individual modes. When the character mode is selected, pixel interval mode ① is applied to the calculation of characteristic amounts and pixel interval mode ② is applied in the normal mode. In the case of the latter combination of modes, pixel interval mode ① is applied to the normal mode and pixel interval mode ② is applied to the copy-output-processible mode.

According to the above processing, erroneous recognition can be prevented when the document is one output from the copying machine, even if the document is not subjected to smoothing filtering prior to the calculation of characteristic amounts. In a case where an enlargement process is performed after an image processing, with witching made in accordance with discrimination and a discrimination result, there arises no problem. However, if an enlargement process is performed with a resolution for reading input data increased, there is a concern that the line pattern may be erroneously discriminated as a part of the character or line. In such a case, it should suffice to increase the interval of compared pixels in accordance with a magnification.

For example, if a normal pixel interval is 3 and a magnification is 141%, it should suffice to set the pixel interval at 4.23≠4. The pixel interval, however, cannot exceed the size of the reference region including the pixel-of-interest. Thus, if the corrected pixel interval is greater than the reference region, the characteristic amounts may be obtained by switching the method to, e.g. BAT method (for finding a difference between a maximum value and a minimum value of the pixels in the reference region). Furthermore, if there is a possibility that the magnification is high and the discrimination ability may greatly deteriorate, the discrimination is not performed.

The characteristic amount obtained by the above arithmetic operation is multiplied with a predetermined coefficient β2 in the multiplier 3110. An output from the multiplier 3110, along with an output, β2·d0, from the multiplier 3105, is supplied to the adder 3111 provided in front of the attribute discrimination section 3107. An output from the adder 3111 is input to the attribute discrimination section 3107.

Accordingly, the signals supplied to the attribute discrimination section 3107 are the following two:

$$m0 = \beta 1 \cdot d0 + \beta 20 \cdot \alpha 0 \quad (6A)$$

$$m45 = \beta 1 \cdot d0 + \beta 21 \cdot \alpha 45 \quad (6B)$$

In this case, the attribute discrimination section 3107 determines the output from the adder 3111 such that only the pixels having values greater than a predetermined threshold th1 are pixels belonging to the character or line. The attribute discrimination section 3107 sets the discrimination signals to be supplied to the switch section 3108 to be 1 (ON) and the discrimination signals associated with the other pixels to be 0 (OFF).

Figure 15:
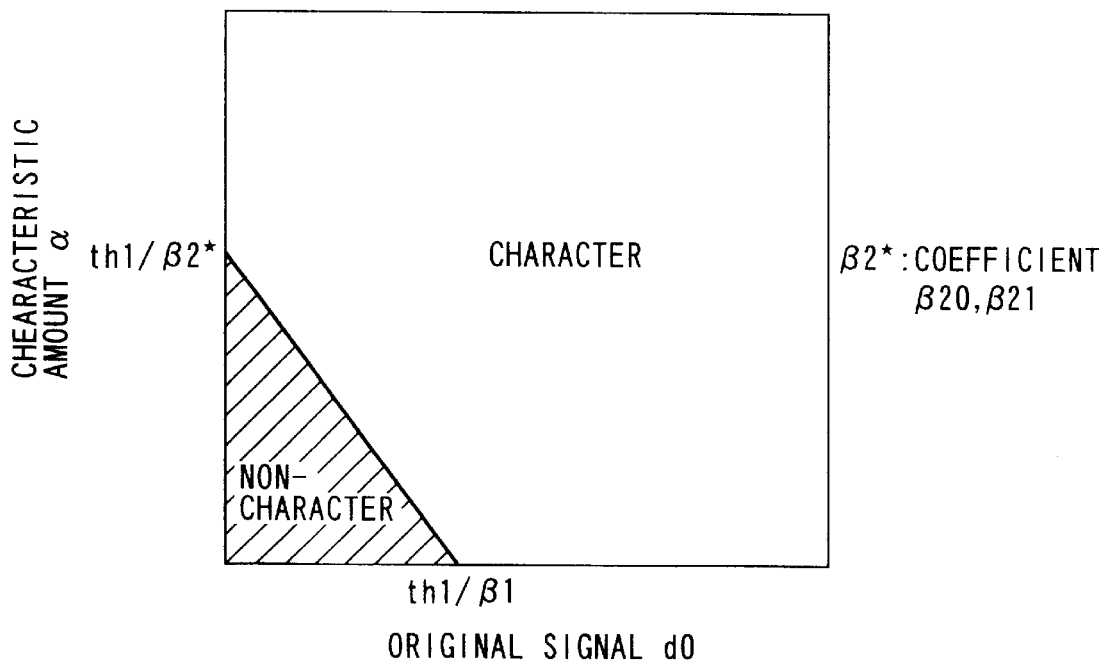
FIG. 15 schematically shows conditions for discrimination.

FIG. 15 schematically shows the conditions for discrimination. The predetermined threshold th1 and coefficients β1, β20 and β21 need to be changed to different values when the conditions for finding characteristic amounts are varied due to a change in document mode or magnification, which is instructed by the control means 3106. For example, as regards the output magnification instructed by the control means 3106, the pixel interval is varied as described above.

Figure 16A:
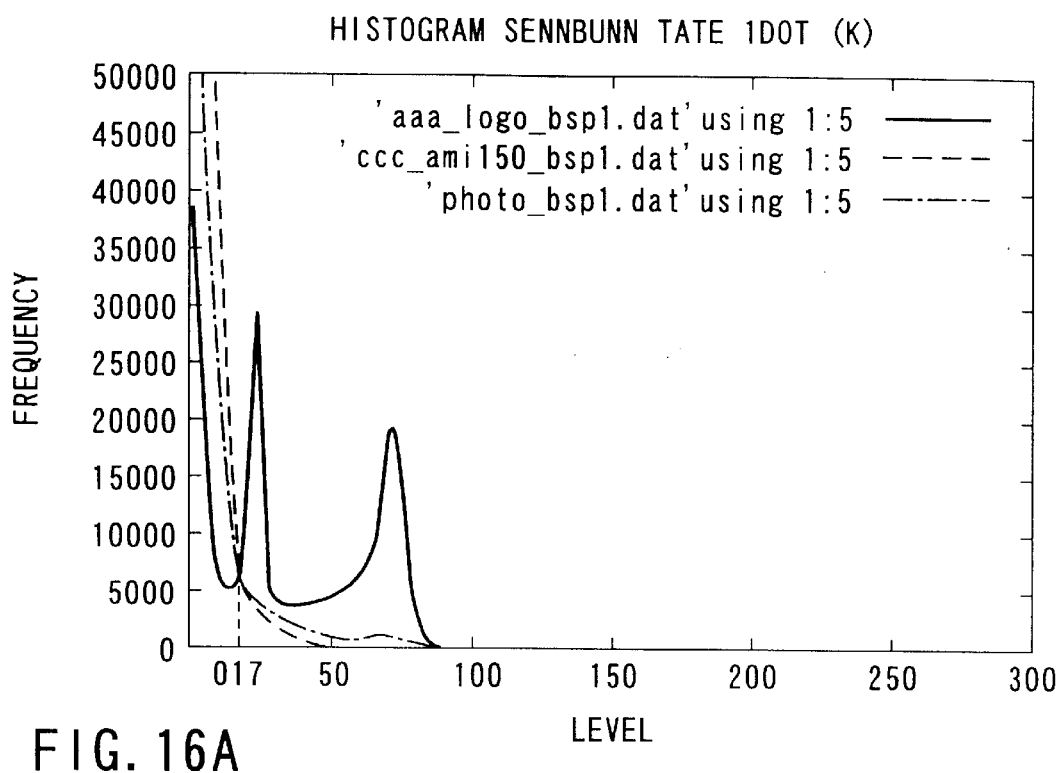
FIG. 16A and FIG. 16B are views for explaining the characteristic amount of the same image when the inter-pixel interval is varied.
Figure 16B:
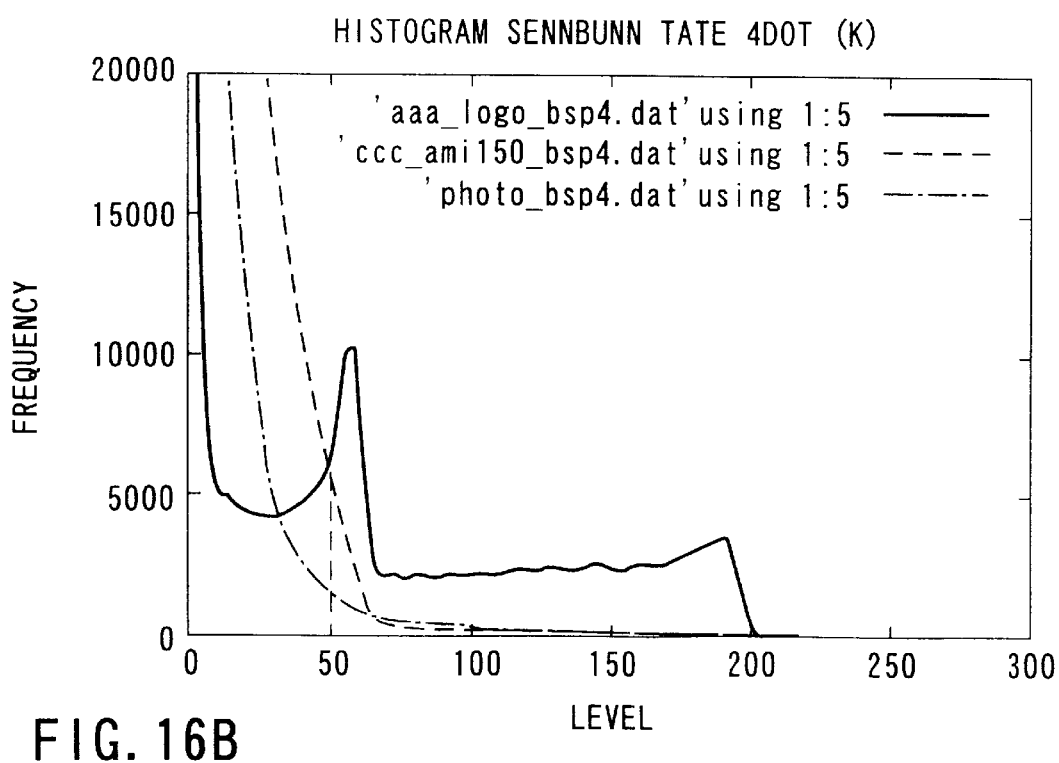

FIGS. 16A and 16B are graphs showing comparison of characteristic amounts of the same image, when the pixel interval is varied. FIG. 16A shows a distribution of characteristic amounts in the vertical and horizontal directions when the pixel interval is 1 dot. FIG. 16B shows a distribution of characteristic amounts when the pixel interval is 4 dots, in which case the characteristic amounts are about three times greater than those in FIG. 16A.

As is clear from FIGS. 16A and 16B, when the characteristic amounts α0 and α45 are to be found, the characteristic amounts increase as the pixel interval increases. In order to perform proper processing in this case, the coefficients are varied in accordance with the variation of values of characteristic amounts before the inputting to the adder 3111. For example, referring to FIGS. 16A and 16B, the coefficients to be multiplied with the characteristic amounts α0 and α45 in FIG. 16A are increased up to about three times the coefficients in the case of FIG. 16B, thereby taking balance with the previous (original) signal value d0.

Accordingly, when the output magnification is less than, e.g. 100%, it is necessary to decrease the coefficient β1 multiplied with the previous signal value d0 or to increase the coefficient β20, β21 multiplied with the characteristic amount. Inversely, if the output magnification is greater than 100%, it is necessary to relatively increase the coefficient β1. In other words, if the coefficient is varied in advance in accordance with the output magnification and the threshold is varied accordingly, no erroneous recognition occurs at any output magnification and desirable images can be obtained.

On the other hand, the same applies to the variation of coefficients in the document mode instructed by the control means 3106. The variation of the pixel interval due to the change of the document mode has already been described above. Proper discrimination results can be obtained in the document mode, by varying the coefficients and threshold in accordance with the variation in the pixel interval, like the variation in the output magnification. There is another case where only an edge portion is to be emphasized, for example, when the document is formed in the photograph mode or net-point mode. In such a case, only the edge portion can be detected by extremely decreasing, or reducing to zero, the coefficient β1 multiplied with the signal value.

As has been described above, according to the second embodiment of the invention, if an output image with higher resolution is needed in the document mode, the pixel interval is decreased, the relative coefficient to be multiplied with the characteristic amount is increased and the threshold is varied accordingly. Thus, the logo character, including its inner portion, can be clearly output with high resolution. If the pattern expressing gradients is not to be emphasized, the reverse setting may be carried out to obtain desirable images.

Moreover, the inner part of the character, which was difficult to discriminate in the prior art, can be discriminated by finding the linear sum of characteristic amounts, which numerically express the deviation between the signal value of the pixel-of-interest and the directions of the edge portions around the pixel-of-interest, and using this linear sum for discrimination.

Besides, in a case where the input document is a document with a net-point image or a character document or where the input document is a document with, e.g. a pencil-written character, which is difficult to discriminate with ordinary discrimination methods or parameters, desirable discrimination results can be obtained by switching the threshold used in the attribute discrimination section 3107 and the coefficients used in the multipliers 3105 and 3110 in accordance with the document mode or output magnification instructed by the control means 3106.

A third embodiment of the present invention will now be described.

The second embodiment was directed to the case where the user inputs changes through the control means. In the third embodiment, a pre-scan is made prior to main-scan discrimination, thus performing statistical arithmetic operations.

Figure 17:
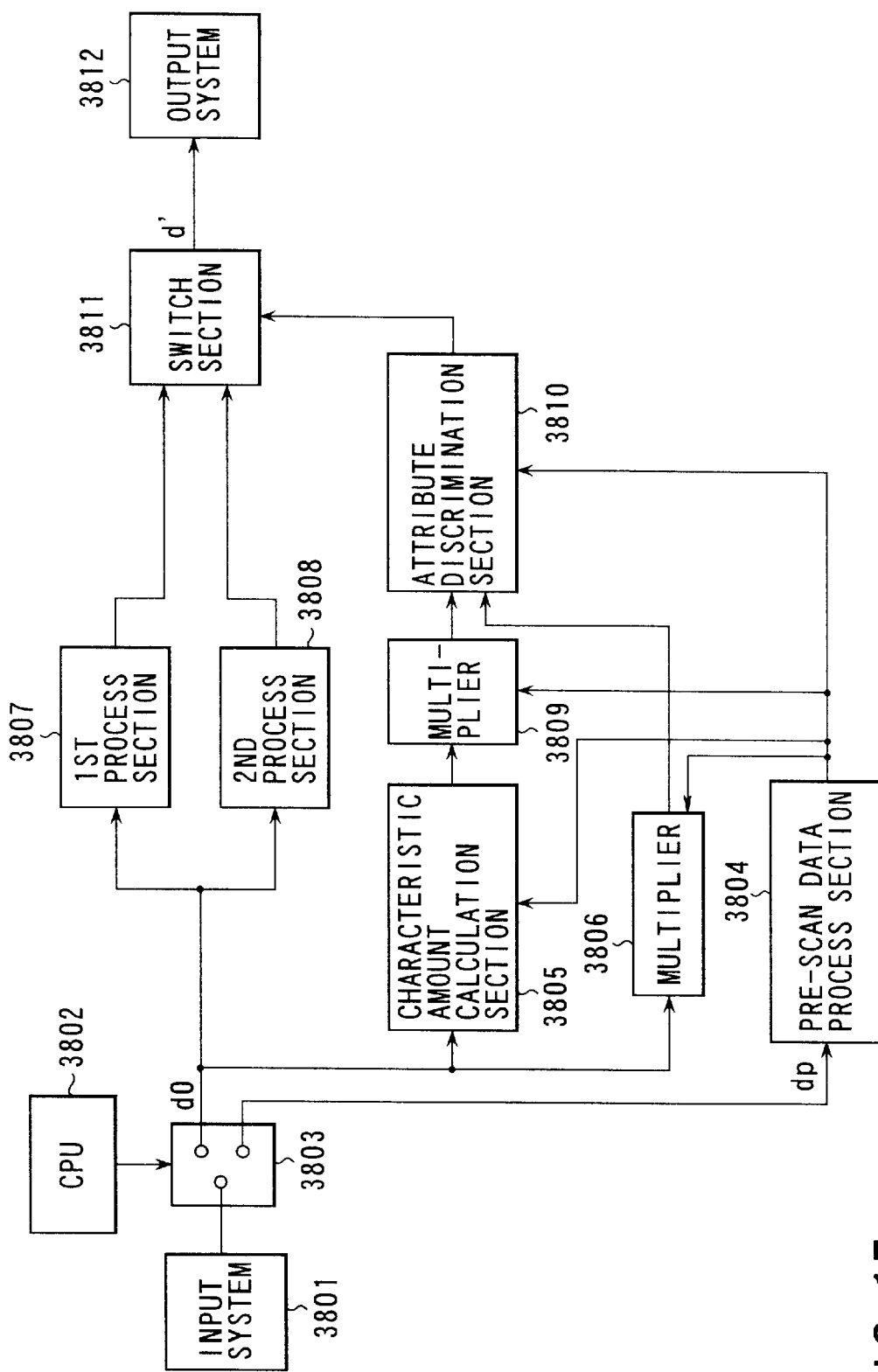
FIG. 17 is a block diagram schematically showing a structure for realizing a third embodiment of the invention.

FIG. 17 schematically shows a structure for achieving the third embodiment.

In FIG. 17, data from an input system 3801 such as a scanner is supplied to a pre-scan data process section 3804 as pre-scan data dp via a switch 3803 which is operated to the pre-scan side by a control signal from a CPU 3802. The pre-scan data dp is provided with a resolution equal to or less than a resolution in the main scan in order to facilitate a data read step or a data counting process. The pre-scan data dp is also provided with a low number of signal levels.

The pre-scan data is input to the pre-scan data process section, and a histogram is formed therein.

In the pre-scan data process section 3804, the pre-scan data dp is processed into a histogram. In the pre-scan data process section 3804, a cumulative histogram is further obtained from the histogram. The cumulative histogram is output to a characteristic amount calculation section 3805 and an attribute discrimination section 3810.

The attribute discrimination section 3810 operates as follows. Specifically, parameters relating to the characteristic amount calculation method for image area discrimination and to the discrimination are switched on the basis of the cumulative histogram. Referring to the cumulative histogram, a level at which the presence of a character portion is determined is found so that a portion of the background other than the character may not be recognized as a character portion, even in a case where paper bearing a printed character is colored paper or rough paper.

A level for slicing upper several % which represent a high average value of the ink amount of black (hereinafter referred to as "K") or the ink amount of cyan, magenta or yellow ("C", "M" or "Y") is estimated from the cumulative histogram and thus a character inside portion is extracted. Thereby, desirable results are obtained without discriminating the background portion from the character inner portion.

Figure 18A:
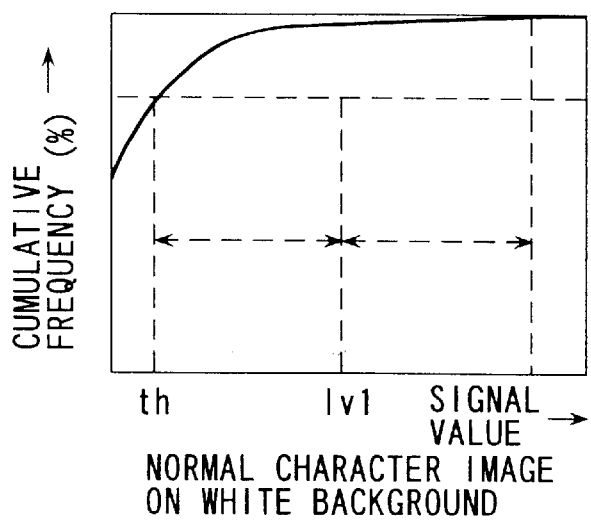
FIGS. 18A to 18C are views for explaining cumulative histograms of character images with different background levels.
Figure 18B:
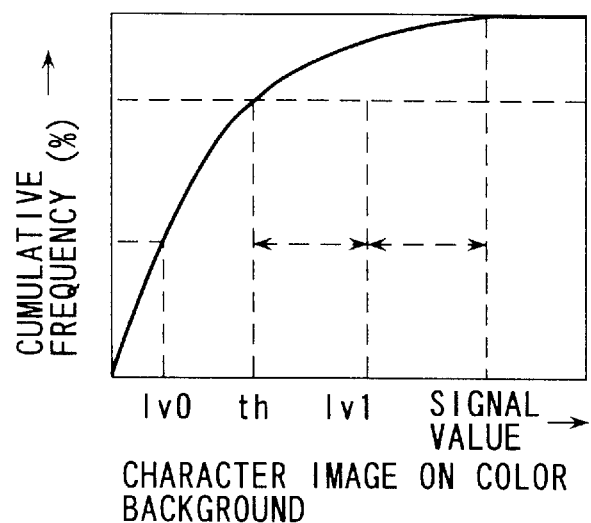
Figure 18C:
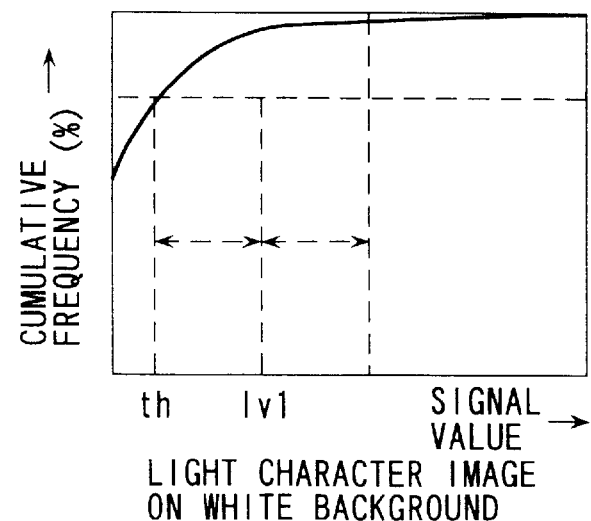

A method of calculating the threshold used for discrimination will now be described. If histograms as shown in FIGS. 18A, 18B and 18C are prepared, the above-mentioned level including up to upper several % of ink amount signal values, which may be regarded as indicating the presence of character, can be easily obtained. If the cumulative histograms as shown in FIGS. 18A, 18B and 18C are obtained, the threshold th1 can be selected, as shown in FIGS. 18A, 18B and 18C, for selecting the logo inner portion in accordance with the density of the background and character on the character image.

At the time of main scan, the CPU 3802 turns the switch 3803 to the side of a first process section 3807, a second process section 3808, characteristic amount calculation section 3805 and a multiplier 3806. An image signal d0 supplied from the input section 3801 is input to the characteristic amount calculation section 3805, first process unit 3807 and second process unit 3808. The characteristic amount calculation section 3805 calculates the characteristic amounts for respective colors for finding the likelihood of presence of characters on the input image. The characteristic amounts to be used for image area discrimination are calculated, for example, by finding absolute values of differences between a pixel-of-interest and peripheral pixels and using the maximum of the absolute values as the characteristic amount for discrimination.

The characteristic amount output from the characteristic amount calculation section 3805 is delivered via a multiplier 3809 to the attribute discrimination section 3819, along with an output from the multiplier 3806. The attribute discrimination section 3810 determines the attributes of the pixels by using the thresholds obtained from the cumulative histogram. The first process section 3807 and second process section 3808 subject the pixels to proper image processing in accordance with the attributes of the pixels. A signal from the attribute discrimination section 3810, which represents the attributes of pixels, is supplied to a switch section 3811 to effect switching between outputs from the first and second process sections 3807 and 3808 in accordance with the attributes of pixels. The output from the switch 3811 is delivered as a final image signal d' to an output system 3812.

According to the third embodiment, the threshold used for discrimination is numerically obtained by using data acquired at the time of pre-scan. Thus, a proper discrimination result is obtained and a desirable output is obtained even if the input document is newspaper, the background portion of which may be erroneously discriminated by the conventional image area discrimination process with fixed conditions, or a character document such as advertisement on which a colored background portion is printed.

A fourth embodiment of the present invention will now be described.

In the third embodiment, a cumulative histogram is obtained from pre-scan data to differentiate the discrimination process. In the fourth embodiment, a frequency distribution of the input image is found from pre-scan data with the same structure as in the third embodiment, and the image area discrimination is switched in accordance with the obtained distribution. In this case, however, the resolution for reading pre-scan data dp is not set to be so high as in the third embodiment. It is necessary to set the resolution for reading to a level (at least about 300 dpi/inch) lower than at least a general pseudo-halftone resolution (about 200 lines/inch). In the pre-scan data process section 3804, the pre-scan data is subjected to digital Fourier transform to obtain a frequency distribution thereof.

FIG. 19A shows a frequency distribution of a net-point character document, and FIG. 19B shows a character distribution of a character on a uniform background. As is understood from comparison between FIGS. 19A and 19B, in the case of a character on a net-point pattern or a line pattern, peaks occur at specific frequencies corresponding to the cycle of the net-points on the frequency distribution. In the case of character document, some peaks may occur at Nyquist frequencies of the reading system, but the frequency of occurrence of peak values is ignorably lower than that of occurrence of peaks in the case of the net-point document. In the case where the frequency distribution is found and compared with the predetermined threshold and the presence of frequencies at which peaks occurs frequently is confirmed, the document to be processed is determined to have a character on the net-point pattern and is subjected to an image area discrimination process different from the process for the character document on the uniform background.

For example, in a case where the document to be processed is determined to be a character document on a net-point pattern or a line pattern, when an image area discrimination process is to be performed, filtering is performed to weaken in advance a highest frequency component of frequency components at which peaks are present. Then the characteristic amount calculation for image area discrimination is performed. If it is determined that there is no peak, the characteristic amount calculation is performed without the filtering process. In the filtering process, for example, frequency components are found with respect to both the main scan direction and pre-scan direction, or two-dimensional frequency components are found. If a peak is confirmed only in one direction, it is highly possible that the document to be processed is a character on the line pattern. Thus, the frequency component in this direction alone is filtered and weakened. Thereby, the decrease in precision of discrimination can be reduced to a minimum.

FIGS. 20A and 20B show examples of an operator for the filtering process. FIG. 20A shows an operator for the filtering process for net-points, and FIG. 20B is an operator for a line pattern having cyclic components in the main scan direction. A filtering process having the same effect only by switching coefficients in FIG. 20A can be performed for the line-pattern. In addition, since the method for calculating the characteristic amount is different, different thresholds are used for discrimination.

In this case, it should suffice if the threshold for the net-points is set to a lower value. In the case of the character on the uniform background, the possibility of degradation of image quality due to erroneous discrimination is low even if the inner portion of the logo is to be detected. Thus, the system may be set such that the inner portion of the character is detected when not only the characteristic amount but also the signal value itself is greater than a predetermined value, as in the second embodiment. If it is desired to detect the inner portion of the logo character on the net-points, too, the threshold for detecting the inner portion of the character may be set to such a very high level as will not affect the image quality.

As has been described above, according to the fourth embodiment of the invention, the frequency characteristics of the input image are found from the pre-scan data, and the method for calculating the characteristic amount of image area discrimination and the parameters for discrimination are varied. Thereby, the image area discrimination with high precision and less image quality degradation can be performed not only on the character document on the net-points or line pattern, but also on the character document on the uniform background.

A fifth embodiment of the invention will now be described.

In addition to the second and fourth embodiments, in the fifth embodiment, the presence/absence of the character on a large area is determined in advance and also the entire area is determined in advance, for example, it is determined whether the area to be processed is an area of a uniform-gradient image or an area of a pseudo-gradient image. On the basis of the determination results of the areas, the parameters delivered to the characteristic amount calculation section and the attribute discrimination section are switched for respective areas.

Figure 21:
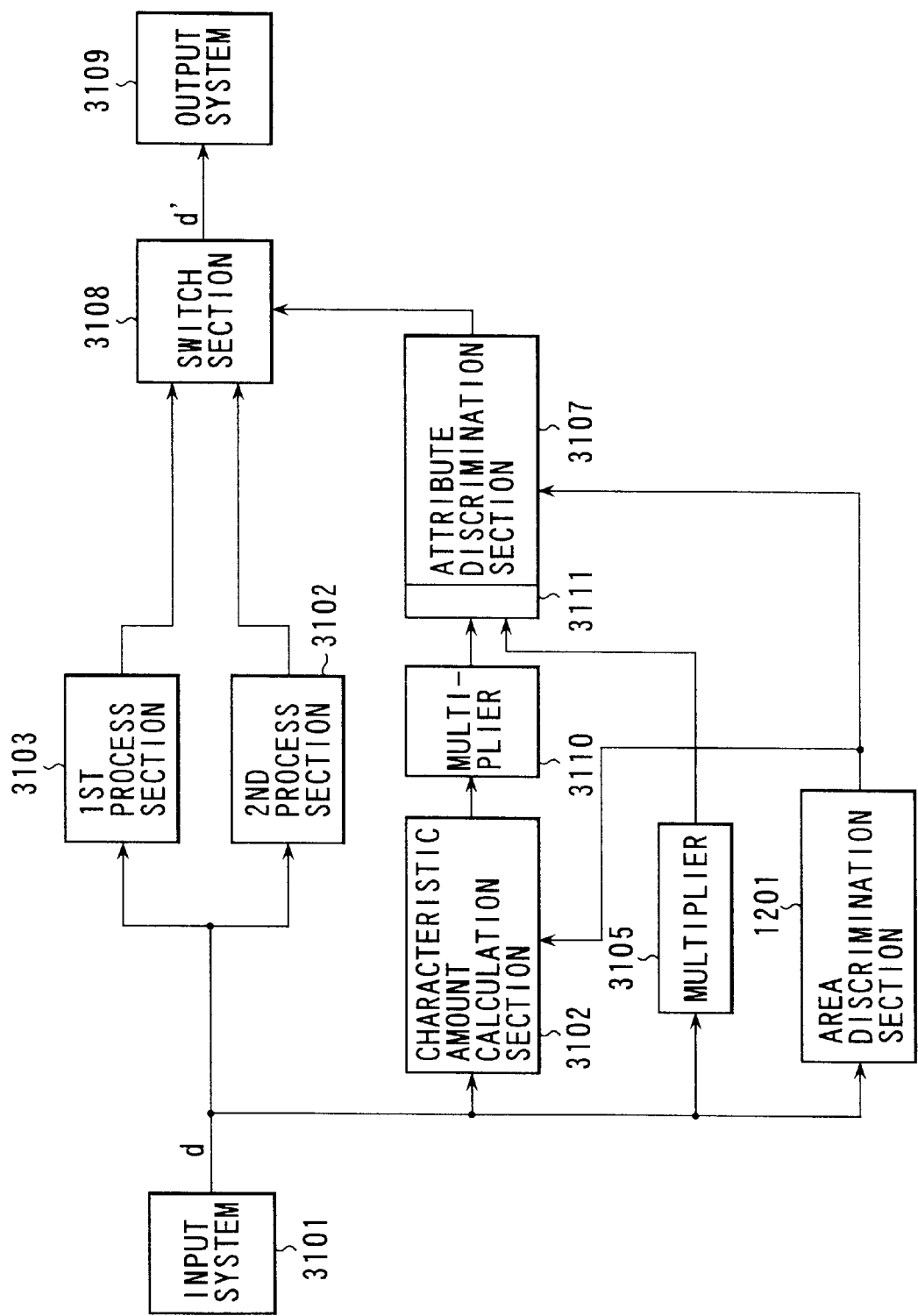
FIG. 21 is a block diagram schematically showing a structure for realizing a fifth embodiment of the invention.

In the present embodiment, the process is performed with a block structure, as shown in FIG. 21, which is substantially the same as the block structure of the second embodiment. The common parts are denoted by like reference numerals and a description thereof is omitted. In this fifth embodiment, an area discrimination section 1201 is substituted for the control means 3106 in the second embodiment.

The area discrimination section 1201 discriminates whether an input pixel-of-interest belongs to a character image, or a gradient image, or a background image. The area discrimination section 1201 prepares, for example, a histogram in units of a block having a size greater than the operator for characteristic amount calculation, and determines whether the area of the input image includes a character.

FIGS. 22A and 22B show examples of histograms. For example, a block to be processed is a part of the image including a character image, the block has a bimodal distribution or a distribution with a plurality of peaks. In the case of an ordinary gradient image, the block has a distribution resembling a Gauss distribution, as shown in FIG. 22B. Based on such characteristics, the area discrimination section 1201 carries out area determination. If a block to be processed is a uniform background, the pixel interval for finding a difference between pixels for characteristic amount calculation is set at one pixel. In the case of a gradient image, in particular, in the case of an output from a copying machine or a pseudo-gradient image, the pixel interval is set at three pixels. In this manner, the parameters for characteristic amount calculation are switched. The coefficients to be multiplied with the characteristic amount or signal value and the threshold to be used for attribute determination are switched to meet the conditions for characteristic amount calculation.

As has been described above, according to the fifth embodiment, the attributes of a large area are determined in advance and discrimination is made for each pixel. Thus, discrimination with higher precision can be made, compared to the discrimination of each of all pixels under the same conditions.

According to the present embodiments of the invention, as described above, the area discrimination can be made with a high degree of separation between the net-points and the character or line, compared to the conventional method. Moreover, the discrimination of a fine character can be made, which was difficult in the conventional discrimination method.

The use of this discrimination technique makes it possible to detect, with high precision, the character or line printed on the net-point background, which was difficult to discriminate in the prior art. A process can be performed to clearly output a character or a line, while preventing moiré on a net-point portion.

The conditions for discrimination are varied according to values corresponding to the chroma and luminance of the pixel-of-interest. Thereby, not only a black character but also colored characters, which are difficult to discriminate, can be discriminated with high precision.

The attributes of a large area are determined in advance and discrimination is made for each pixel. Thus, discrimination with higher precision can be made, compared to the discrimination of each of all pixels under the same conditions.

With the addition of the simple arithmetic section, not only an edge portion but also an inner portion of a thick character, such as a logo character, can be discriminated, compared to the conventional method. Thus, the image quality of the logo character can be enhanced.

A document, such as a pencil-written character document, in which a character itself is often thin and blurry and detection of an edge portion is difficult, can be discriminated by optimizing the parameters. Non-uniformity due to non-detection of part of a character is prevented.

The entire character including both an inner portion and an edge portion of a character can be discriminated by adding the simple arithmetic section, without increasing the amount of hardware such as line memories for expansion of discrimination areas.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:

control means for outputting a control signal for switching calculation conditions for characteristic amounts and discrimination conditions for attributes in accordance with a set document mode;

characteristic amount calculation means for calculating a characteristic amount of an input image signal on the basis of the calculation condition switched by the control signal output from the control means;

first multiplication means for multiplying the characteristic amount calculated by the characteristic amount calculation means with a predetermined coefficient;

second multiplication means for multiplying the input image signal with a predetermined coefficient;

attribute discrimination means for generating a discrimination signal for discriminating attributes of the input image signal on the basis of an output from the first multiplication means and an output from the second multiplication means, under the attribute discrimination condition switched by the control signal from the control means; and output means for outputting an image signal which has been subjected to an image process according to the discrimination signal from the attribute discrimination means.

2. The image processing apparatus according to claim 1, wherein the image processing apparatus includes first process means for subjecting the input image signal to an image process and second process means for subjecting the input image signal to an image process different from the image process performed by the first process means, and an image signal processed by the first process means and an image signal processed by the second process means are switched in accordance with the discrimination signal from the attribute discrimination means, and the produced image signal is delivered to the output means.

3. An image processing apparatus comprising:

control means for effecting switching between an image signal for image processing and an image signal for pre-processing;

processing means for finding a cumulative frequency of a signal value of the image signal for pre-processing, which is switched and input by the control means;

characteristic amount calculation means for calculating a characteristic amount of the image signal for image processing, which is switched and input by the control means, on the basis of the cumulative frequency found by the processing means;

first multiplication means for multiplying the characteristic amount calculated by the characteristic amount calculation means with a predetermined coefficient;

second multiplication means for multiplying the image signal for image processing, which is switched and input by the control means, with a predetermined coefficient;

attribute discrimination means for discriminating attributes of the input image signal for image processing, on the basis of an output from the first multiplication means and an output from the second multiplication means, with reference to the cumulative frequency found by the processing means; and output means for outputting an image signal which has been subjected to an image process according to attribute discrimination information from the attribute discrimination means.

4. An image processing apparatus comprising:

control means for effecting switching between an image signal for image processing and an image signal for pre-processing;

processing means for finding a frequency distribution of the image signal for pre-processing, which is switched and input by the control means;

characteristic amount calculation means for calculating a characteristic amount of the image signal for image processing, which is switched and input by the control means, on the basis of the frequency distribution found by the processing means;

first multiplication means for multiplying the characteristic amount calculated by the characteristic amount calculation means with a predetermined coefficient;

second multiplication means for multiplying the image signal for image processing, which is switched and input by the control means, with a predetermined coefficient;

attribute discrimination means for discriminating attributes of the input image signal for image processing, on the basis of an output from the first multiplication means and an output from the second multiplication means, with reference to the frequency distribution found by the processing means; and output means for outputting an image signal which has been subjected to an image process according to attribute discrimination information from the attribute discrimination means.

5. An image processing apparatus comprising:

area discrimination means for discriminating whether a predetermined area of an input image signal includes a character image;

characteristic amount calculation means for calculating a characteristic amount of the input image signal on the basis of a discrimination result from the area discrimination means;

first multiplication means for multiplying the characteristic amount calculated by the characteristic amount calculation means with a predetermined coefficient;

second multiplication means for multiplying the input image signal with a predetermined coefficient;

attribute discrimination means for discriminating attributes of the input image signal on the basis of an output from the first multiplication means and an output from the second multiplication means, with reference to the discrimination result from the area discrimination means; and output means for outputting an image signal which has been subjected to an image process according to attribute discrimination information from the attribute discrimination means.

6. The image processing apparatus according to claim 5, wherein the area discrimination means discriminates which of a character image, a gradient image and a background the predetermined area of the input image signal belongs to.

* * * * *